A United States Patent Office 3,318,491
Patented May 9, 1967

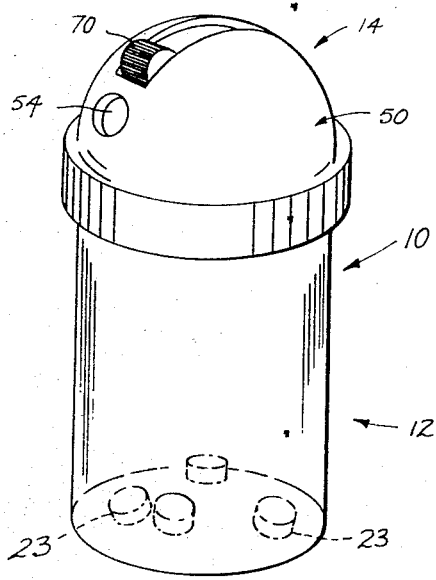
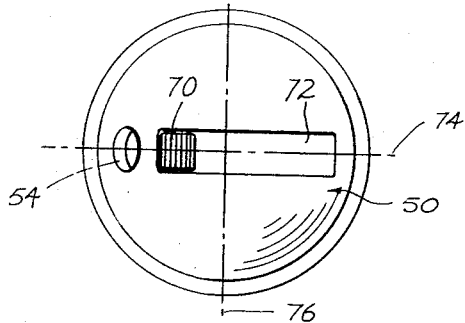
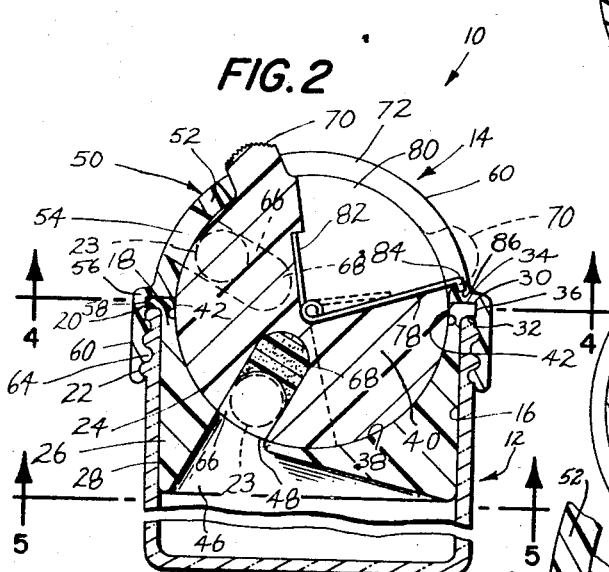
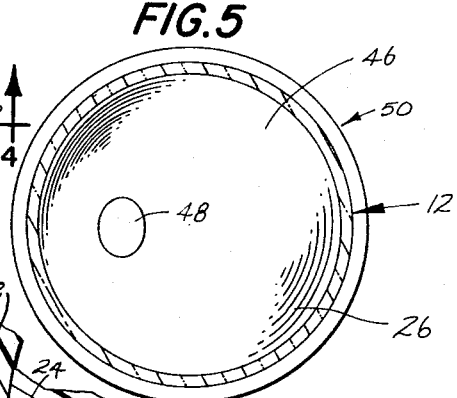
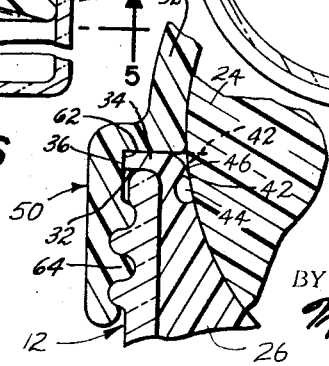

3,318,491
CONTAINER HAVING A TRAP-CHAMBER DISPENSING MEANS
Jervis C. Williamson, Watrous Ave. and Rte. 95, Mystic, Conn. 06355
Filed June 14, 1965, Ser. No. 463,553
6 Claims. (Cl. 222—363)

This invention relates, in general, to containers and more particularly to container dispensing apparatus for singly discharging articles from a storage container.

The general object of the invention is to provide a dispensing storage container for small articles which, upon each actuation, will dispense a single article therefrom.

Another object of the invention is to provide a dispensing closure for a container for singly dispensing articles from the container.

A further object of the invention is to provide a dispensing closure apparatus for sealing a container to protect the contents thereof from dust, moisture, and atmospheric contamination.

Still another object of the invention is to provide a dispensing closure apparatus for sealing a storage container, which closure apparatus maintains its sealing qualities while articles are being dispensed from the container.

A still further object of the invention is to provide a unitary dispensing closure apparatus which will serve as a primary closure or sanitary seal for a container.

A more particular object of the invention is to provide a dispensing closure apparatus for a storage container for singly dispensing small articles of uniform shape and size, such as pills and the like, from the container.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a perspective view of a container and dispensing closure apparatus embodying the present invention.

FIG. 2 is a vertical half sectional view through the container and dispensing apparatus of FIG. 1.

FIG. 3 is a plan view of the container and dispensing apparatus of FIG. 1.

FIG. 4 is a sectional view through the dispensing closure, taken along the line 4—4 of FIG. 2.

FIG. 5 is a sectional view through the container, taken along the line 5—5 of FIG. 2.

FIG. 6 is an enlarged fragmentary sectional view of the container and dispensing apparatus of FIG. 2.

In its broadest aspect the invention contemplates a container defining an interior for storing articles and having an opening therein. A generally spherical rotary dispensing element is disposed within the container opening and is operable to segregate a single article from the other articles in the container and to move the segregated article to a discharge or dispensing position from which the article is discharged exteriorly of the container.

In use the container may be filled with pills, tablets or other small articles to be dispensed. Although the size and shape of the articles may vary within reasonable limits, preferably the articles are of substantially uniform size and shape.

Referring now to the drawing and more particularly to FIGS. 1 and 2, a container and dispensing closure embodying the invention is indicated generally by the numeral 10 and comprises a container and a dispensing closure, respectively indicated generally at 12 and 14.

The container of the present invention may assume various general forms and have various physical characteristics, but as shown the container 12 is a glass bottle of the type commonly used for containing pills, tablets, and the like. The bottle 12 is straightsided and includes a generally cylindrical neck having a throat surface 16 defining an opening or mouth 18 and having a finish or lip 20. Surrounding the neck of the bottle 12 is a threaded portion 22 for receiving a conventional screw-on cap or closure. A quantity of tablets 23, 23 are shown stored within the container 12.

Serving the dual function of both a closure and a dispensing apparatus, a rotary dispensing element, or dispenser 24, hereinafter further described, is supported at least partially within the mouth 18. Preferably and as shown, the lower or inwardly extending portion of the dispenser 24 is received and supported by a plug 26 disposed within the neck of the container 12. The plug 26 is preferably made from a resilient material, and cooperates with the dispenser 24 providing a means for directing the articles to be dispensed thereto.

The shape of the plug 26 will vary in accordance with the shape of the associated container. Preferably, the plug includes a peripheral surface 28 generally complementing the throat surface 16 so that when the plug is received in the container, the peripheral surface 28 engages the throat surface 16 producing substantial sealing engagement therebetween. On the outer end of the plug is included a flange 30 having a lower bearing surface 32 engaging the lip 20 when the plug is received within the container. The flange 30 also includes an upper bearing surface 34 and a peripheral edge surface 36 which is preferably scalloped, as best shown in FIG. 4, for a reason to be hereinafter discussed. A socket wall 38 defining a generally hemispherical socket 40 opening outwardly through the upper surface 34 receives and supports the dispenser 24.

To impart dust, moisture, and atmospherically resistant qualities to the container, a seal means is preferably provided between the plug 26 and the dispenser 24. In the presently preferred embodiment of the invention, an annular lip 42 formed at the outer edge of the socket 40 and extending radially inwardly therefrom constitutes the said seal means, as best shown in FIG. 6. Prior to assembly the diameter of the socket opening defined by the lip 42 is slightly smaller than the diameter of the associated portion of the dispenser 24 received in the socket 40 as best shown in FIG. 6, the position of the lip 42 being indicated by broken lines. To increase the flexibility of the resilient lip an annular recess 44 is defined within the plug 26 adjacent the lip 42 and terminates acutely therewith. Thus, as the dispensing element 24 is brought into assembly with the socket 40 the resilient lip 42 is deflected from its radially extending position and generally into the recess 44 causing the socket opening defined by the lip 42 to be forcibly enlarged. The dispenser 24 assumes a position wherein a portion of the bearing surface 34 defined by the lip 42 surrounds an associated portion thereof in sealing engagement therewith.

Articles to be dispensed pass from the container to the dispensing element through a channel formed in plug.

Preferably, and as shown, the channel comprises a funnel-shaped aperture 46 communicating with the interior of the contaner 12 and with the socket 40. Viewed from the interior of the container, the aperture 46 converges outwardly to an opening 48 at the outer, or socket end of the plug. The configuration of the opening 48 preferably generally conforms with the size and shape of the articles to be dispensed thereby allowing the articles to pass singly therethrough.

A retaining means for holding the dispenser 24 in position is provided by a cover or cap engaging a portion of the spherical surface of the dispenser 24, and establishing connection with the container. In the presently preferred embodiment of the invention, a cap 50 comprises a raised generally hemispherical wall 52 defining a generally hemispherical cavity receiving the upper, or outwardly extending portion of the dispenser 24. At least one opening 54 extending through the wall 52 provides a discharge port for dispensing articles exteriorly of the container. The cap 50 is preferably made from a resilient material and includes a flanged base portion 56 defining a lower bearing surface 58. A generally cylindrical portion 60 of the cap extends downwardly and surrounds the outer peripheral surface of the neck of the container establishing connection therewith.

The cap 50 is preferably adapted for preassembly with the plug to form a generally spherical chamber for holding the dispenser 24 rotatably disposed therein. To facilitate assembly with the plug 26, the lower side of the flange portion 56 contains an annular recess defined by the lower bearing surface 58 and by a generally annular surface 62 complementing and tightly engaging the scalloped peripheral edge surface 36 of the plug 26. Since the cap 50 and the plug 26 are preferably made from resilient materials, the complementary scalloped surfaces 62 and 36 may be arranged to snap into engagement to retain the cap 50, the dispenser 24 and the plug 26 in assembly forming a unitary closure structure or dispensing closure 14. However, it should be understood that other methods of assembly may be employed, which methods may include adhesive bondings.

Connection between the bottle 12 and the closure 14 is preferably established and maintained by a thread 64 formed upon the interior surface of the cylindrical portion 60 and adapted to engage the threaded portion 22 on the bottle 12. In the embodiment shown, the plug 26 is generally cylindrical and is free to rotate within the neck of the bottle as the closure 14 is brought into threadable engagement therewith.

Containers of various shapes may be used in practicing the invention. Thus, when the neck of the container and the opening therein takes other than cylindrical form the fitted plug cannot be rotated within the neck of the container during assembly. A closure that engages the container with a snap-on action would ordinarily be employed in this type of an assembly and such closure arrangements are contemplated within the scope of the invention.

The bottle 12 and the closure 14 cooperate in assembly to affect sealing engagement between the lip 20 and the bearing surface 32 and between the upper bearing surface 34 and the lower bearing surface 56.

The dispenser of the present invention provides a means for segregating a single article to be dispensed and for moving the article to a position wherefrom it is discharged exteriorly from the container. For segregating and discharging an article from the container, at least one article-receiving recess, or pocket 66 is defined within the dispensing element 24. The size and shape of the pocket may vary, but preferably the pocket is shaped to generally conform with the size and shape of the article to be dispensed. To minimize the risk of damaging fragile articles, such as pills, tablets, or the like, the pocket preferably contains a soft resilient liner 68 which may be sponge rubber, or other material of like characteristics. Rotation of the dispenser 24 relative to the closure 14 serves to move the pocket from a position wherein it communicates with the channel 38 to a position wherein it communicates with the discharge port 54.

In the presently preferred embodiment of the invention, a means for moving the dispenser 24 relative to the closure 14 is provided by a tab 70 preferably integrally formed upon the dispenser 24. The tab 70 is disposed within and extends outwardly through a slot 72 defined by the cap wall 52. The length of the slot 72 controls the angular rotation of the dispenser 24 relative to the cap and the plug. Thus, as shown in FIG. 2, the tab is movable from the full line position wherein the pocket 64 communicates with the channel 38 to the dotted line position wherein the pocket communicates with the discharge opening 54.

The tab 70, the discharge port 54, and the channel opening 42 lie generally within a diametric plane 74 of the dispenser 24, as best shown in FIG. 3. The tab 70 and the slot 72 cooperate to confine the dispenser 24 to rotational movement about an axis 76 normal to the diametric plane 72, thereby assuring proper alignment of the closure parts at all times.

Optionally, and as shown, a V-shaped spring 78 can be provided as in a V-shaped slot 80 to urge the dispenser to the closed position. One end portion 82 of the spring engages the dispenser 24 and the other end portion 84 similarly engages the cap at 86.

A primary seal upon the container may be maintained by the simple expedient of immobilizing the tab 72 with a piece of sealing tape, or the like, in a manner commonly employed in the packaging art. Thus, a consumer may purchase the product associated with the container with assurance that the contents have not been disturbed.

The invention claimed is:

1. A container apparatus for storing and dispensing articles comprising a container defining an interior for storing articles and having an opening therein, a resilient plug disposed within said opening having a surface defining a generally hemispherical socket and an aperture communicating with said container interior and with said socket surface, said plug including an integrally formed annular lip projecting inwardly from said socket surface and a lip receiving recess adjacent thereto, said lip before assembly being disposed in a generally radial plane, a generally spherical dispenser received in assembly in said socket for rotational movement therein, said dispenser in assembly deflecting said lip generally inwardly from said radial plane into said recess, said dispenser including at least one article recess for receiving an article to be dispensed and being rotatable between a loading position wherein said recess communicates with said aperture and a dispensing position wherein said recess opens exteriorly of said container to dispense the article, and retaining means for holding said dispenser in position within said socket for rotational movement therein.

2. The combination defined in claim 1 including spring means for urging said dispenser toward said loading position.

3. A container apparatus as defined in claim 1 wherein said retaining means comprises a cap having a surface defining a generally hemispherical cavity therein and a discharge port therethrough said cap surrounding a portion of said dispenser and engaging said container proximate said opening, said recess in said dispensing position communicating with said discharge port, and said cap having an opening communicating with the dispenser for rotation of the latter.

4. A container apparatus as defined in claim 3 wherein said cap opening comprises a slot generally disposed within a diametric plane and wherein said dispenser includes a tab outwardly extending through said slot and movable therealong.

5. A container apparatus as defined in claim 4 wherein said dispenser defines a generally V-shaped slot, said apparatus including a generally V-shaped spring engaging said dispenser within said slot and including an end portion engaging said cap, said spring biasing said dispenser toward said loading position.

6. A container apparatus as defined in claim 5 wherein said aperture is generally conical converging outwardly from said interior.

References Cited by the Examiner

UNITED STATES PATENTS

| | | | |
|---|---|---|---|
| 1,537,410 | 5/1925 | Courtney | 222—368 X |
| 1,853,493 | 4/1932 | Bell | 222—368 |
| 2,127,465 | 8/1938 | Church | 222—368 |
| 2,424,675 | 7/1947 | Wood | 222—368 |
| 2,533,449 | 12/1950 | Frazer | 222—364 |
| 2,820,577 | 1/1958 | Winters et al. | 222—306 |
| 3,135,434 | 6/1964 | Mittelsteadt | 222—306 |
| 3,161,321 | 12/1964 | Mellion et al. | 221—266 |
| 3,194,453 | 7/1965 | Cherba | 222—545 |

FOREIGN PATENTS 405,901  2/1934  Great Britain.

ROBERT B. REEVES, *Primary Examiner.*

WALTER SOBIN, *Examiner.*